United States Patent
Wheatley et al.

(10) Patent No.: US 9,921,345 B2
(45) Date of Patent: Mar. 20, 2018

(54) OPTICAL SYSTEMS HAVING VARIABLE VIEWING ANGLES

(71) Applicant: 3M INNOVATIVE PROPERTIES COMPANY, St. Paul, MN (US)

(72) Inventors: John A. Wheatley, Lake Elmo, MN (US); Guanglei Du, Woodbury, MN (US); Robert L. Brott, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/301,780

(22) PCT Filed: May 27, 2015

(86) PCT No.: PCT/US2015/032539
§ 371 (c)(1),
(2) Date: Oct. 4, 2016

(87) PCT Pub. No.: WO2015/183867
PCT Pub. Date: Dec. 3, 2015

(65) Prior Publication Data
US 2017/0176652 A1    Jun. 22, 2017

Related U.S. Application Data

(60) Provisional application No. 62/005,573, filed on May 30, 2014.

(51) Int. Cl.
*G02B 5/02* (2006.01)
*F21V 8/00* (2006.01)
(Continued)

(52) U.S. Cl.
CPC .............. *G02B 5/02* (2013.01); *G02B 6/0051* (2013.01); *G02F 1/137* (2013.01);
(Continued)

(58) Field of Classification Search
CPC ... G02B 5/02; G02B 6/0051; G02F 1/133362; G02F 1/137; G02F 1/13781
See application file for complete search history.

(56) References Cited

U.S. PATENT DOCUMENTS

| 4,542,449 A | 9/1985 | Whitehead |
| 4,824,216 A | 4/1989 | Perbet |
(Continued)

FOREIGN PATENT DOCUMENTS

| EP | 1229422 | 8/2002 |
| JP | 2006-332816 | 12/2006 |
(Continued)

OTHER PUBLICATIONS

Walker, "Structured surfaced for active daylighting", Ixscent, 2013, 18pgs.
(Continued)

*Primary Examiner* — Thomas M Sember
(74) *Attorney, Agent, or Firm* — Clifton F. Richardson

(57) ABSTRACT

Optical systems are described that include a lighting component, a switchable diffuser adjacent the lighting component, and a low-absorbing optical component disposed adjacent the switchable diffuser opposite the lighting component or disposed adjacent the lighting component opposite the switchable diffuser or disposed adjacent the lighting component opposite the display panel. The switchable diffuser is capable of being in either a substantially clear state or in a first hazy state. The low-absorbing optical component provides a collimating effect or a turning effect when the lighting component is illuminated and the switchable diffuser is in the substantially clear state.

22 Claims, 3 Drawing Sheets

(51) Int. Cl.
*G02F 1/1333* (2006.01)
*G02F 1/137* (2006.01)

(52) U.S. Cl.
CPC .... *G02F 1/13781* (2013.01); *G02F 1/133362* (2013.01); *G02F 2001/13756* (2013.01)

(56) References Cited

U.S. PATENT DOCUMENTS

| | | |
|---|---|---|
| 4,893,117 A | 1/1990 | Blomley |
| 5,109,219 A | 4/1992 | Kastan |
| 5,175,030 A | 12/1992 | Lu |
| 5,183,597 A | 2/1993 | Lu |
| 5,831,698 A | 11/1998 | Deep |
| 5,877,829 A | 3/1999 | Okamoto |
| 6,039,533 A | 3/2000 | McCabe |
| 6,211,930 B1 | 4/2001 | Sautter |
| 7,349,043 B2 | 3/2008 | Sumiyoshi |
| 7,532,800 B2 | 5/2009 | Iimura |
| 7,630,026 B2 | 12/2009 | Sumiyoshi |
| 7,699,516 B1 | 4/2010 | Lee |
| 8,405,572 B1 | 3/2013 | Want |
| 2005/0083564 A1 | 4/2005 | Mallya |
| 2005/0259193 A1 | 11/2005 | Sumiyoshi |
| 2006/0256244 A1 | 11/2006 | Jak |
| 2007/0030240 A1 | 2/2007 | Sumiyoshi |
| 2009/0015540 A1 | 1/2009 | Suzuki |
| 2009/0207613 A1 | 8/2009 | Furukawa |
| 2009/0225244 A1 | 9/2009 | Wang |
| 2009/0244690 A1 | 10/2009 | Lee |
| 2010/0014027 A1 | 1/2010 | Li |
| 2011/0225542 A1 | 9/2011 | Schmieder |
| 2011/0234605 A1 | 9/2011 | Smith |
| 2011/0241983 A1 | 10/2011 | Chang |
| 2011/0261038 A1 | 10/2011 | Jiang |
| 2011/0273490 A1 | 11/2011 | Shimazaki |
| 2011/0279472 A1 | 11/2011 | Lu |
| 2012/0038990 A1 | 2/2012 | Hao |
| 2012/0075355 A1 | 3/2012 | Ogita |
| 2012/0130845 A1 | 5/2012 | Telek |
| 2012/0139897 A1 | 6/2012 | Butler |
| 2012/0249407 A1 | 10/2012 | Hatakeyama |
| 2012/0256976 A1 | 10/2012 | Inada |
| 2012/0280895 A1 | 11/2012 | Yeh |
| 2012/0293750 A1 | 11/2012 | Yeh |
| 2012/0299982 A1 | 11/2012 | Inada |
| 2013/0010219 A1 | 1/2013 | Yeh |
| 2013/0021390 A1 | 1/2013 | Inada |
| 2013/0033466 A1 | 2/2013 | Uehara |
| 2013/0057492 A1 | 3/2013 | Kubota |
| 2013/0100112 A1 | 4/2013 | Yeh |
| 2013/0113685 A1 | 5/2013 | Sugiyama |
| 2013/0124982 A1 | 5/2013 | Zornow |
| 2014/0043568 A1 | 2/2014 | Yeh |
| 2014/0053262 A1 | 2/2014 | Sarangdhar |

FOREIGN PATENT DOCUMENTS

| | | |
|---|---|---|
| JP | 2011-197537 | 10/2011 |
| KR | 2004-0061947 | 7/2004 |
| KR | 2007-0051471 | 5/2007 |
| KR | 2013-0058487 | 6/2013 |
| WO | WO 2001-63396 | 8/2001 |
| WO | WO 2004-079437 | 9/2004 |
| WO | WO 2007-058458 | 5/2007 |
| WO | WO 2007-083540 | 7/2007 |
| WO | WO 2011-034157 | 3/2011 |
| WO | WO 2013-061598 | 5/2013 |
| WO | WO 2015-183869 | 12/2015 |

OTHER PUBLICATIONS

International Search Report for PCT International Application No. PCT/US2015/032539, dated Sep. 7, 2015, 3pgs.

OPTICAL SYSTEMS HAVING VARIABLE VIEWING ANGLES

BACKGROUND

Polymer dispersed liquid crystal (PDLC) layers can be used as a switchable diffuser in conjunction with louver films to provide a variable viewing angle display. There are, however, several deficiencies with such approaches. For example, PDLC layers have a haze in the clear state that is sufficiently high to be objectionable in many display applications. In addition, louver films absorb a significant portion of the light in a backlight system and this can result in an inefficient display. Accordingly, a need exists for improved variable viewing angle displays.

SUMMARY

In some aspects of the present description, an optical system is provided that includes a switchable diffuser having a first major surface, a low-absorbing optical component disposed adjacent the switchable diffuser opposite the first major surface, and a lighting component disposed to illuminate the switchable diffuser from the first major surface. The switchable diffuser is capable of being in a substantially clear state or in a first hazy state. The optical system is configured such that either an air interface is present at the first major surface of the switchable diffuser or a low-index layer is disposed between the lighting component and the switchable diffuser. The low-absorbing optical component provides a collimating effect or a turning effect when the lighting component illuminates the switchable diffuser from the first major surface and the switchable diffuser is in the substantially clear state.

In some aspects of the present description, an optical system is provided that includes a light guide, a switchable diffuser adjacent the light guide, and a low-absorbing optical component disposed adjacent the switchable diffuser opposite the light guide or disposed adjacent the light guide opposite the switchable diffuser or disposed adjacent the light guide opposite an output surface of the optical system. The switchable diffuser is capable of being in either a substantially clear state or in a first hazy state. An air gap or a low-index layer separates the switchable diffuser and the light guide. The low-absorbing optical component provides a collimating effect or a turning effect when a light is input into the light guide and the switchable diffuser is in the substantially clear state.

In some aspects of the present description, an optical system is provided that includes a light guide including light extraction features, a switchable diffuser adjacent the light guide, and a low-absorbing optical component disposed adjacent the switchable diffuser opposite the light guide or disposed adjacent the light guide opposite the switchable diffuser or disposed adjacent the light guide opposite an output surface of the optical system. The switchable diffuser is capable of being in a substantially clear state or in a first hazy state. The low-absorbing optical component provides a collimating effect or a turning effect when a light is input into the light guide and the switchable diffuser is in the substantially clear state.

DETAILED DESCRIPTION

Figure 1:
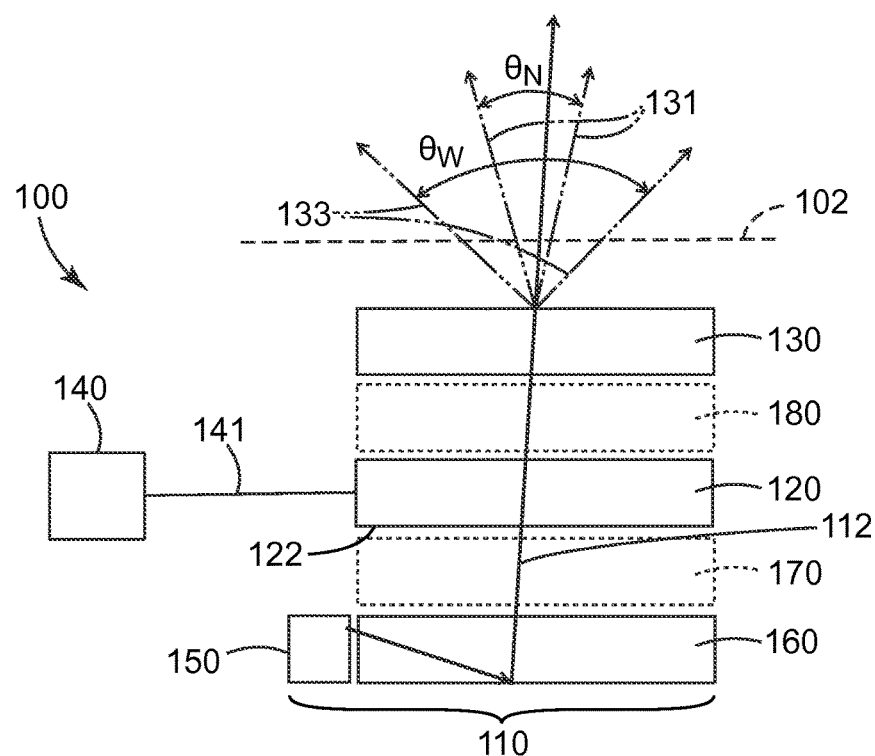
FIG. 1 is a side view of an optical system.

In the following description, reference is made to the accompanying set of drawings that form a part of the description hereof and in which are shown by way of illustration specific embodiments. The figures are not necessarily to scale. Unless indicated otherwise, similar features for one embodiment may include the same materials, have the same attributes, and serve the same or similar functions as similar features for other embodiments. Additional or optional features described for one embodiment may also be additional or optional features for other embodiments, even if not explicitly stated, where appropriate. It is to be understood that other embodiments are contemplated and may be made without departing from the scope or spirit of the present description. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent.

Use of a polymer dispersed liquid crystal (PDLC) layer in a display in connection with a louver film in order to obtain a switchable privacy film has been described in the art. However, louver films absorb light, especially at off-normal incidence, and can therefore be inefficient when used in a recycling backlight. It is also known that a PDLC layer can be used with refractive elements to vary viewing angle in a display. However, in such displays, the PDLC layer is positioned outside of the recycling region provided by the refractive elements and a reflector positioned near a light guide opposite the refractive elements. This positioning is chosen so that the inherent haze in the relatively clear state of the PDLC layer does not interfere with the recycling process.

The applicants have discovered that optical systems that have a switchable diffuser layer in a region between low-absorbing elements, which may be refractive elements, and a light guide can provide a high uniformity in a wide angle viewing mode without appreciably degrading the narrow angle viewing mode. This is achieved by a suitable selection of the switchable diffuser. It may be desirable to position the low-absorbing elements within a recycling cavity since such geometries allow integrated optical systems to be constructed. For example, as discussed in detail elsewhere, prism films may be integrated with a switchable diffuser layer by laminating a prism film to the switchable diffuser with an optically clear adhesive.

In some embodiments, the switchable diffuser includes smectic A liquid crystals. A switchable diffuser including smectic A liquid crystals can have an on-axis haze of about 3% or less when the switchable diffuser is in a substantially clear state. In some cases the on-axis haze can be as low as 1%. In contrast, PDLC diffusers have an on-axis haze of greater than 5% when in their clearest state. The off-axis haze of a PDLC diffuser is significantly higher than 5% when in its clear state, while the off-axis haze of a smectic A diffuser remains low off axis. The maximum haze of smectic A switchable diffusers and PDLC switchable diffusers approach 100 percent. Haze can be defined as the percent of transmitted light that is scattered so that its direction deviates more than 2.5 degrees from the direction of the incident beam as specified in ASTM D1003-13 "Standard Test Method for Haze and Luminous Transmittance of Transparent Plastics". Haze can be determined using a HAZE-GARD PLUS meter available from BYK-Gardner Inc. (Silver Springs, Md.) which complies with the ASTM D1003-13 standard.

As used herein, a "bistable" switchable diffuser is an electrically switchable diffuser having one or more regions where each region has two or more states that are substantially stable. "Substantially stable" means that the states are maintained over a time period, such as hours or days, without a voltage applied across the switchable diffuser. In some embodiments, the switchable diffuser includes smectic A liquid crystal which is bistable. Electrically switchable diffusers using smectic A liquid crystal have a substantially stable substantially clear state, and a plurality of substantially stable hazy states that can be characterized by the haze value in the various hazy states.

Embodiments of the present disclosure include optical systems having a switchable diffuser that intersects an optical path extending from a lighting component through a display panel and through a low-absorbing optical component to an output surface. In some embodiments, the switchable diffuser is disposed such that light is first transmitted through the switchable diffuser and then transmitted to a low-absorbing collimating component. In some cases, such embodiments can be described as providing a collimating component after providing a de-collimating component along a common optical path. In some embodiments, the low-absorbing optical component is disposed in a recycling cavity. In some embodiments, the low-absorbing optical component is disposed adjacent the switchable diffuser opposite a first major surface of the switchable diffuser. In some embodiments, the low-absorbing optical component is disposed adjacent the switchable diffuser opposite the lighting component or disposed adjacent the lighting component opposite the switchable diffuser or disposed adjacent the lighting component opposite an output surface of the optical system. In some embodiments, the lighting component includes one or more light emitting diodes (LEDs). In some embodiments, the lighting component includes a light guide with a light source, such as LEDs, disposed to inject light into an edge of the light guide. Suitable light guides are described in US Pat. App. Pub. No.2010/0014027 (Li et al.) and U.S. Pat. No. 7,532,800 (Iimura) and U.S. Pat. No. 7,699,516 (Lee).

FIG. 1 is a schematic side view of optical system 100 having an output surface 102 and including lighting component 110 that is capable of producing light having optical path 112. Optical system 100 includes electrically switchable diffuser 120 having first major surface 122, display panel 130 which may have a narrow viewing angle output 131 or a wide viewing angle output 133, and diffuser controller 140 which provides diffuser state data to switchable diffuser 120 on diffuser data channel 141. Lighting component 110 includes light source 150 and light guide 160. Lighting component 110 is disposed adjacent switchable diffuser 120 opposite output surface 102. Optical system 100 can also include optional optical film 170 and includes optical component 180. Either or both of optional optical film 170 and optical component 180 can be a single film or can be a stack of films which may be laminated together with an optically clear adhesive or may be stacked together with an air gap between layers. In some embodiments, optional optical film 170 is included and is a low-index layer. In some embodiments, optional optical film 170 is not included so that only an air gap separates switchable diffuser 120 and light guide 160 and so that an air interface is present at first major surface 122. In some embodiments, optical film 170 is a diffuser.

As used herein, "low-index" material refers to a material having a refractive index less than or equal to about 1.45. As used herein, unless specified differently, "refractive index" refers to refractive index for light having a wavelength of 589 nm (sodium D line) at 25° C. In some embodiments, the low-index material is an optically clear adhesive having a refractive index less than or equal to about 1.45 or less than or equal to about 1.42 or less than or equal to about 1.41 or less than or equal to about 1.39. Suitable low-index optically clear adhesives include Norland Optical Adhesives 1315, 132, 138, 142, and 144 having refractive indices quoted by the manufacturer ranging from 1.315 to 1.44 (available from Norland Products, Cranbury, N.J.). In some embodiments, the low-index layer is an ultra low-index (ULI) layer having a refractive index less than about 1.3 or less than about 1.2 or even less than about 1.15. Suitable ULI materials include nanovoided materials such as those described in U.S. Pat. Appl. Pub. No. 2012/0038990 (Hao et al.).

Display panel 130 may include a liquid crystal display panel and may include other components such as a reflective polarizer for polarization recycling. Alternatively, a reflective polarizer may be included as a layer of optical component 180. Optical system 100 may further include a reflector disposed adjacent light guide 160 opposite switchable diffuser 120 which may be used to increase efficiency by providing recycling of light reflected back through light guide 160 by optional optical film 170, optical component 180 or a reflective polarizer that may be included with display panel 130. In some embodiments, light guide 160 includes a light reflecting rear surface.

In some embodiments, when switchable diffuser 120 is in a first state, optical system 100 produces a wide viewing angle output 133 having a characteristic viewing angle $\theta_W$ and when switchable diffuser 120 is in a second state, optical system 100 produces a narrow viewing angle output 131 having a characteristic viewing angle $\theta_N$. The characteristic viewing angle may be defined in terms of the output angular distribution of the intensity as the full width at half maximum. In some embodiments, there is a first characteristic viewing angle along a first direction and a second characteristic viewing angle along a second direction different from the first direction. For example, optical system 100 may have an output with a narrow viewing angle in a vertical direction when switchable diffuser 120 is both the first and second states and may have a wide viewing angle output in a horizontal direction when switchable diffuser 120 is in a first state and a narrow viewing angle output in a horizontal direction when switchable diffuser 120 is in a second state. In other embodiments, optical system 100 may have a wide viewing angle output in both a vertical and a horizontal direction when switchable diffuser 120 is in a first state and a narrow viewing angle output in both a vertical and a horizontal direction when switchable diffuser 120 is in a second state. In some embodiments the first state is a first hazy state and the second state is a substantially clear state.

Diffuser data channel 141 is configured to provide diffuser state data and switching signals to switchable diffuser 120. In some embodiments, the diffuser controller 140 is implemented using a Central Processing Unit (CPU) in a computer. In some embodiments, the diffuser controller 140 is implemented using a microcontroller unit disposed in a monitor. Optical system 100 is configured such that diffuser controller 140 is capable of sending a signal or signals to switchable diffuser 120 on diffuser data channel 141 to cause the switchable diffuser to change states. In some embodiments, diffuser controller 140 sends a signal on diffuser data channel 141 to a switching device which applies a voltage waveform to the switchable diffuser in order to cause the switchable diffuser to change states.

Various embodiments of optical systems including a diffuser controller and/or a switching device are discussed in commonly assigned U.S. Patent Application Ser. No. 62/005542, entitled "Variable Viewing Angle Optical Systems" and filed on an even date herewith, which is hereby incorporated herein by reference in its entirety.

In some embodiments, optical component 180 includes one or more prism films which partially collimates light output from the light guide 160 to the display panel 130. When the switchable diffuser 120 is in a substantially clear state, the partially collimated light that passes through optical component 180 is still partially collimated when it reaches display panel 130. The output from the display panel 130 is then partially collimated so that it provides a first light output in a narrow viewing angle mode. When the switchable diffuser is in a hazy state, the partially collimated light is partially diffused by the switchable diffuser resulting in a less collimated light reaching the display panel 130 so that it provides a second light output in a wide viewing angle mode.

In some embodiments, light output from the light guide 160 is partially collimated and optical component 180 is a turning film that receives partially collimated light from light guide 160 at an input angle and transmits partially collimated light at a direction closer to a normal to display panel 130. In some embodiments, optical component 180 is configured to provide a light output having a first angular distribution when a light input having a second angular distribution is provided to optical component 180. In some embodiments, the first angular distribution either has a mean output direction substantially closer to a normal of output surface 102 the optical system 100 (i.e., optical component 180 provides a turning effect) or is substantially more collimated compared to the second angular distribution (i.e., optical component 180 provides a collimating effect).

Louver films absorb light, especially at off-normal incidence, and can therefore be inefficient when used in a recycling backlight. In preferred embodiments, optional optical film 170, if included, and optical component 180 are low absorbing. As used herein, "low-absorbing" films or components are films or components that absorb less than about 20 percent of the luminous flux of an input light from standard illuminant E having a Lambertian angular distribution. Standard illuminant E is an equal-energy illuminant having a spectral power distribution that is constant over the visible wavelength range (380 nm-780 nm). Louver films, in comparison, can absorb about 30% of the luminous flux of an input light from standard illuminant E having a Lambertian angular distribution. In some embodiments, low-absorbing components or films are used that absorb less than about 15% or less than about 10% or even less than about 5% the luminous flux of an input light from standard illuminant E having a Lambertian angular distribution. As used herein, a "low-absorbing region" is a rectangular parallelepiped shaped region containing materials or components that absorb less than about 20 percent of the luminous flux of an input light from standard illuminant E having a Lambertian angular distribution. In some embodiments, low-absorbing regions contain materials or components that absorb less than about 15% or less than about 10% or even less than about 5% the luminous flux of an input light from standard illuminant E having a Lambertian angular distribution.

In some embodiments, optical component 180 is low-absorbing optical component, which is disposed adjacent switchable diffuser 120 opposite the first major surface 122, and which provides a collimating effect or a turning effect when the lighting component 110 illuminates the switchable diffuser 120 from the first major surface 122 and the switchable diffuser is in a substantially clear state.

In the embodiment shown in FIG. 1, switchable diffuser 120 is positioned between light guide 160 and display panel 130. In other embodiments, the light guide may be positioned between the display panel and the switchable diffuser with a reflector positioned adjacent the switchable diffuser opposite the light guide. This type of arrangement is illustrated in FIG. 2.

Figure 2:
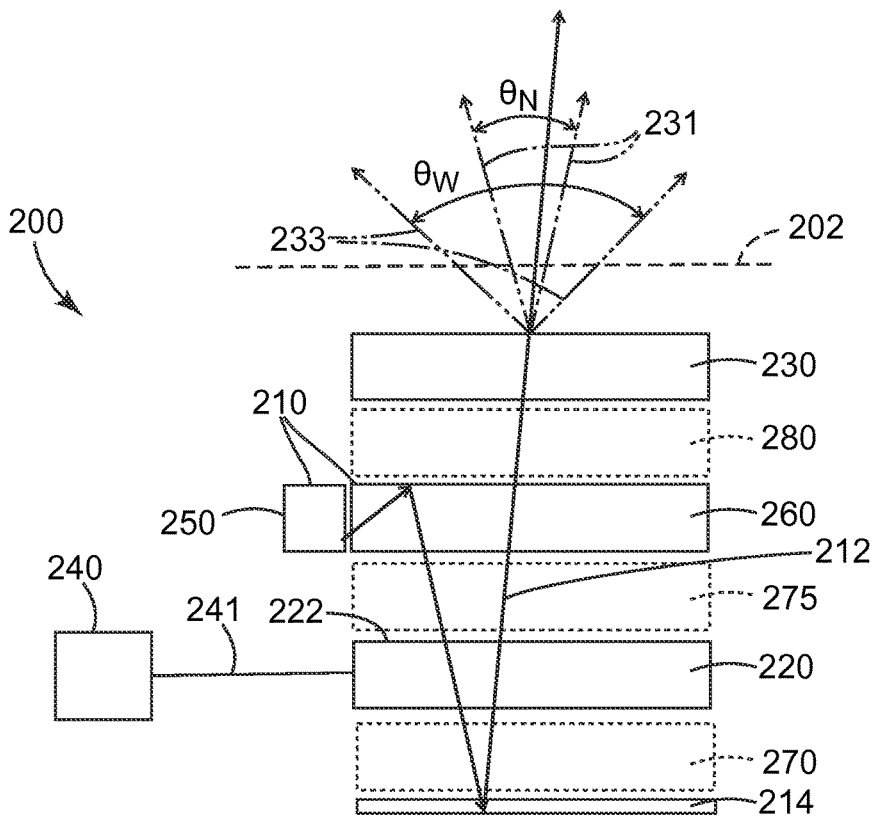
FIG. 2 is a side view of an optical system.

FIG. 2 is a schematic side view of optical system 200 having an output surface 202 and including lighting component 210 that is capable of producing light having optical path 212 which reflects from reflector 214. Optical system 200 includes electrically switchable diffuser 220 having first major surface 222, display panel 230 which may have a narrow viewing angle output 231 or a wide viewing angle output 233, and diffuser controller 240 which provides diffuser state data to switchable diffuser 220 on diffuser data channel 241. Lighting component 210 includes light source 250 and light guide 260. Lighting component 210 is disposed between display panel 230 and switchable diffuser 220. Optical system 200 also includes one or more of first optional optical component 270, second optional optical component 275, and third optional optical component 280. One or more of optional optical components 270, 275 and 280 can be a single film or can be a stack of other films which may be laminated together with an optically clear adhesive or may be stacked together with an air gap between layers. Display panel 230 may include a liquid crystal display panel and may include other components such as a reflective polarizer for polarization recycling. In some embodiments, optional optical component 275 is not included so that only an air gap separates switchable diffuser 220 and light guide 260 and so that an air interface is present at first major surface 222.

In some embodiments, first optional optical component 270 is a low-absorbing optical component that is included and is disposed adjacent the switchable diffuser 220 opposite light guide 260. In some embodiments, second optional optical component 275 is a low-absorbing optical component that is included and is disposed adjacent the light guide 260 opposite the output surface 202 of the optical system 200. In some embodiments, third optional optical component 280 is a low-absorbing optical component that is included and is disposed adjacent the light guide 260 opposite the switchable diffuser 220. In some embodiments, one or more of optional optical component 270, 275 and 280 are included and provide a collimating effect or a turning effect when a light is input into light guide 260 and the switchable diffuser is in a substantially clear state. For example, first optional optical component 270 or second optional optical component 275 may be a prism film with prism tips facing light guide 260 and light guide 260 may include extraction features which extract light partially collimated in a direction away from the normal to light guide 260. The prism film then acts as a turning film providing partially collimated output in a direction closer to a direction normal to the display panel 230.

In some embodiments, when switchable diffuser 220 is in a first state, optical system 200 produces a wide viewing angle output 233 having a characteristic viewing angle $\theta_W$ and when switchable diffuser 220 is in a second state, optical system 200 produces a narrow viewing angle output 231 having a characteristic viewing angle $\theta_N$. The characteristic viewing angle may be defined in terms of the output angular distribution of the intensity as the full width at half maximum. In some embodiments, there is a first characteristic viewing angle along a first direction and a second characteristic viewing angle along a second direction different from the first direction. For example, optical system 200 may have an output with a narrow viewing angle in a vertical direction when switchable diffuser 220 is both the first and second states and may have a wide viewing angle output in a horizontal direction when switchable diffuser 220 is in a first state and a narrow viewing angle output in a horizontal direction when switchable diffuser 220 is in a second state. In other embodiments, optical system 200 may have a wide viewing angle output in both a vertical and a horizontal direction when switchable diffuser 220 is in a first state and a narrow viewing angle output in both a vertical and a horizontal direction when switchable diffuser 220 is in a second state.

Diffuser data channel 241 is configured to provide diffuser state data and switching signals to switchable diffuser 220. In some embodiments, the diffuser controller 240 is implemented using a CPU in a computer. In some embodiments, the diffuser controller 240 is implemented using a microcontroller unit disposed in a monitor. The system is configured such that the diffuser controller 240 is capable of sending a signal or signals to the switchable diffuser on diffuser data channel 241 to cause the switchable diffuser 220 to change states.

In some embodiments, one or more of optional optical components 270, 275 and 280 include a film or films which partially collimate light output from the light guide 260 to the display panel 230. For example, third optional optical component 280 may be a prism film with prism tips facing display panel 230. In this case, the prism film recycles light having a propagation direction having a large angle from the direction normal to display panel 230 resulting in a partially collimated output when the switchable diffuser 220 is in a substantially clear state. The partially collimated output from the display panel then provides a first light output in a narrow viewing angle mode. When the switchable diffuser is in a hazy state, the light output from the light guide 260 is partially diffused by the switchable diffuser resulting in a less collimated light reaching the display panel 230 so that it provides a second light output in a wide viewing angle mode. In some embodiments, one or more of optional optical components 270, 275 and 280 are configured to provide a light output having a first angular distribution when a light input having a second angular distribution is provided to optical component 270, 275 or 280. In some embodiments, the first angular distribution either has a mean output direction substantially closer to a normal of output surface 202 the optical system 200 or is substantially more collimated compared to the second angular distribution.

As noted elsewhere, louver films absorb light, especially at off-normal incidence, and can therefore be inefficient when used in a recycling backlight. In preferred embodiments, optional optical components 270, 275 and 280, if included, are low-absorbing components.

Optical system 100 or optical system 200 may be used in a display or may be used in a lighting system. For example, a lighting system may use optical system 100 without display panel 130 or optical system 200 without display panel 230 as luminaires. Any of the optical systems described herein may be used in display applications or may be used in luminaire applications.

Figure 3:
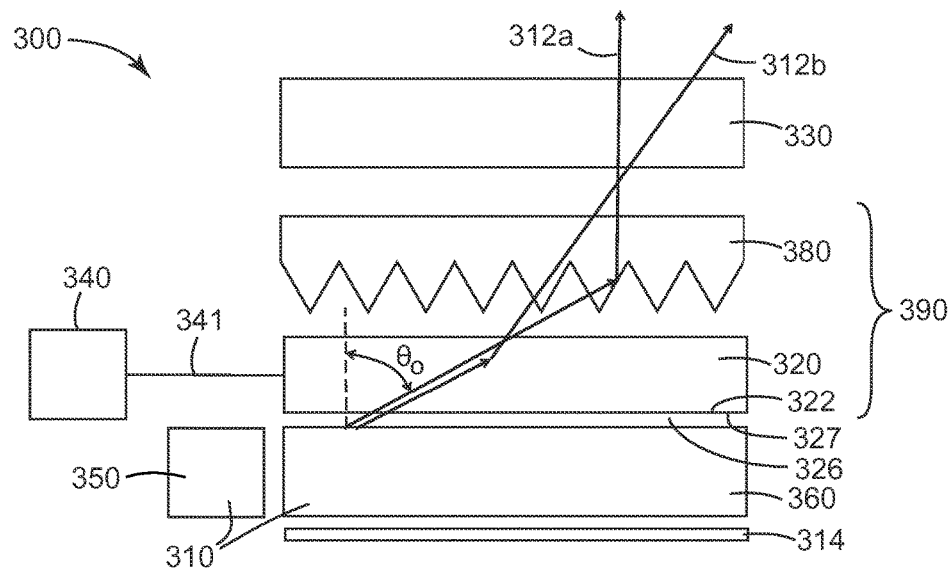
FIG. 3 is a side view of an optical system.

An embodiment of a system having the general structure of optical system 100 of FIG. 1 where optional optical film 170 is not included and optical component 180 is a turning film is illustrated in FIG. 3.

FIG. 3 is a schematic side view of optical system 300 including lighting component 310, reflector 314, switchable diffuser 320 having a first major surface 322, display panel 330, and diffuser controller 340 which provides diffuser state data to switchable diffuser 320 on diffuser data channel 341. Lighting component 310 includes light source 350 and light guide 360. Optical system 300 is capable of producing light having optical path 312a and light having optical path 312b. Optical system 300 also includes turning film 380 which is a prism film disposed with prisms facing toward lighting component 310. Display panel 330 may include a liquid crystal display panel and may include a reflective polarizer for polarization recycling. Reflector 314 is included to provide recycling of light reflected from turning film 380 and/or from a reflective polarizer included with display panel 330.

Optical system 300 includes a region 390 extending from the light guide 360 through the turning film 380, which may be a low-absorbing optical component, and extending across first major surface 322 of the switchable diffuser 320. In some embodiments, region 390 is a low-absorbing region.

Figure 7:
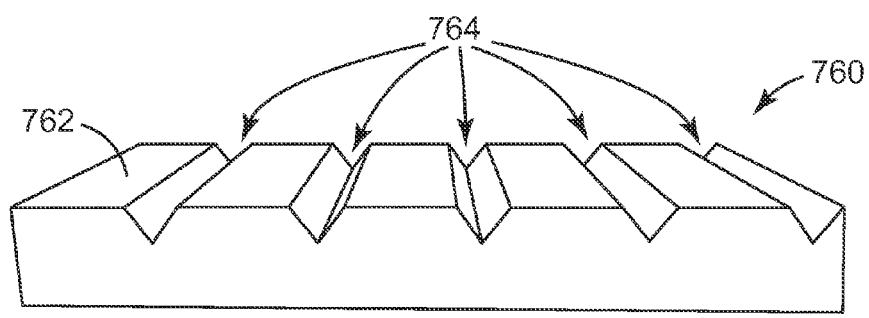
FIG. 7 is a perspective view of a light guide.

Light guide 360 provides a light output that has an angular distribution with a peak intensity at an angle $\theta_O$ relative to a normal to the light guide. This can be achieved by using various extraction features in the light guide as is known in the art. Suitable extraction features include microstructures that may be created by injection molding, printing dots on a surface of the light guide, or molding the top and/or bottom surface of the light guide. The extraction features may be diffractive or refractive. Extraction features may also include converging, tapered surfaces to the light guide. Extraction features and methods of providing extraction features are described in U.S. Pat. No. 6,039,533 (Lundin et al.) and U.S. Pat. App. Pub. No. 2009/0244690 (Lee), for example. An example of a light guide suitable for use in embodiments of the present description is illustrated in FIG. 7 which is a perspective view of a light guide 760. Light guide 760 has a first major surface 762 that includes light extraction features 764.

The output of the light guide may be partially collimated along the direction defined by the angle $\theta_O$. $\theta_O$ may be, for example, in the range of about 30 degrees to about 75 degrees. Light from the light guide 360 passes through the switchable diffuser 320 to the turning film 380. Turning film 380 is configured to turn light having a propagation direction specified by the angle $\theta_O$ toward the normal of the display panel. Light incident on turning film 380 at input angles substantially different from $\theta_O$ will not necessarily be turned toward the normal of the display panel. In other words, turning film 380 has a preferred input angle and will provide a preferred output when light having the preferred input angled is provided but will generally not provide the preferred output when other input distributions are provided.

When the switchable diffuser 320 is in a substantially clear state, light passes through switchable diffuser 320 without any substantial scattering so that it is provided to turning film 380 at the turning film's preferred input angle. The light is then turned by turning film 380 so that it has an output direction closer to the normal of the display panel than it would have had without the turning film 380 present. For example, a light ray may follow optical path 312a when the diffuser is in a substantially clear state. When switchable diffuser 320 is in a hazy state, light from light guide 360 can be deflected as it passes through switchable diffuser 320 to turning film 380 so that it is not provided to turning film 380 at the turning film's preferred input angle. This allows the light to exit the display panel at a large angle relative to the normal to the display panel. For example, a light ray may follow optical path 312b when the diffuser is in a hazy state.

Turning films generally include a microstructured surface, and the film is disposed such that the microstructured surface faces the light output surface of the lighting component. The microstructured surface can include any microstructured feature (any shape or size) as long as light from the lighting component can be redirected as desired. Useful turning films comprise microstructured features that are prisms; exemplary turning films of this sort include 3M Transmissive Right Angle Film II also known as TRAF II, and 3M Brightness Enhancement Film also known as BEF, both available from 3M Company (St. Paul, Minn.). In general the turning film can have any shape, size, surface structure, and/or orientation of features as long as the desired light redirecting function is achieved. If a plurality of features is used, then the number and/or arrangement of the features may be used to achieve the desired light redirecting function. Turning films can be fabricated by any number of methods known by those skilled in the art. Such methods include but are not limited to fabricating a tool using engraving, embossing, laser ablation or lithographic methods, then employing the tool to create the structured film/layer via cast-and-cure or extrusion replication techniques. Turning films may be produced from optical materials with low absorbance in the visible light range so that the turning films are low absorbing films.

Materials useful for constructing light guides, turning films, prism films and other optical components include acrylic resins, such as polymethylmethacrylate (PMMA), polystryrene, polycarbonate, polyesters, and silicones.

In the embodiment illustrated in FIG. 3, only an air gap 326 separates switchable diffuser 320 and light guide 360 so that there is an air interface 327 present at first major surface 322. In other embodiments, a low-index layer separates switchable diffuser 320 and light guide 360.

Figure 4:
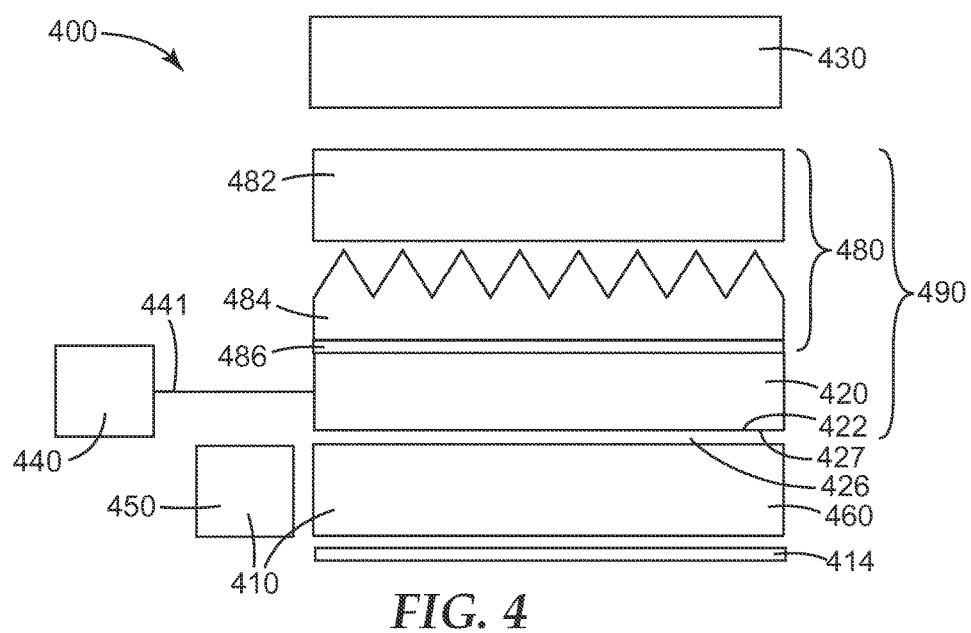
FIG. 4 is a side view of an optical system.

An embodiment of a system having the general structure of optical system 100 of FIG. 1 where optional optical film 170 is not included and optical component 180 includes crossed prism films is illustrated in FIG. 4.

FIG. 4 is a schematic side view of optical system 400 including lighting component 410, reflector 414, switchable diffuser 420 having a first major surface 422, display panel 430, and diffuser controller 440 which provides diffuser state data to switchable diffuser 420 on diffuser data channel 441. Lighting component 410 includes light source 450 and light guide 460. Optical system 400 also includes film stack 480 which includes a first prism film 482, a second prism film 484 and an optical coupling layer 486. Display panel 430 may include a liquid crystal display panel and may include a reflective polarizer film for polarization recycling. Optical system 400 includes a region 490 extending from the light guide 460 through the film stack 480, which may be a low-absorbing optical component, and extending across first major surface 422 of the switchable diffuser 420. In some embodiments, region 490 is a low-absorbing region.

Prisms films can be Brightness Enhancement Films (BEF) available from 3M Company (St. Paul, Minn.). In some embodiments, two prism films are used. For example, first prism film 482 can have linear prisms extending along a first direction and second prism film 484 can have prisms extending along a second direction different from the first direction. In some embodiments, the first direction and the second direction are substantially orthogonal. Prism films can be made using the techniques described elsewhere for making turning films.

Optical coupling layer 486 can be any optically clear adhesive. Suitable optically clear adhesives include 3M Optically Clear Adhesive 8142KCL or 3M Optically Clear Adhesive 8146-X, both available from 3M Company (St. Paul, Minn.). In some embodiments, optical coupling layer 486 is chosen to have a refractive index close to the refractive index of second prism film 484. For example, in some embodiments, 3M Optically Clear Adhesive 8146-X, which has a refractive index of 1.474 for light having a wavelength of 589 nm (sodium D line) at 25° C., is used with an acrylic prism film having a refractive index of 1.491 for light having a wavelength of 589 nm (sodium D line) at 25° C.

Light output from lighting component 410 passes through switchable diffuser 420 and interacts with prism films 482 and 484. If switchable diffuser 420 is in a substantially clear state, prism films 482 and 484 reflect light having a high incidence angle (i.e., large input angle relative to a normal axis) toward reflector 414 which then reflects light back towards prism films 482 and 484. Reflector 414 may be a diffuse or a semi-specular reflector so that a portion of the light that reflects away from reflector 414 has an angle of reflection different from the angle of incidence. Optical system 400 can recycle light to produce a partially collimated output. Prism films that increase collimation by a recycling mechanism are known in the art and are described, for example, in U.S. Pat. No. 4,542,449 (Whitehead), U.S. Pat. No. 5,175,030 (Lu et al.), and U.S. Pat. No. 5,183,597 (Lu). If switchable diffuser 420 is in a hazy state, the input into the prism films 482 and 484 has a partially randomized angular distribution due to passing through the switchable diffuser 420. In this case, the prism films are less effective in partially collimating the light output and so the resulting light output is a wide viewing angle output. Film stack 480 can be made from optical materials having low absorbance in the visible light range so that film stack 480 is a low absorbing film stack.

This embodiment can be described in terms similar to those used to describe the embodiment where a turning film is used. Film stack 480 has a preferred angular input distribution such that when light having this angular input distribution is supplied, film stack 480 outputs partially collimated light. When other angular light distributions are supplied, for example an angular light distribution partially randomized by passing through a diffuser, film stack 480 is not as effective in collimating the light output.

In the embodiment illustrated in FIG. 4, only an air gap 426 separates switchable diffuser 420 and light guide 460 so that there is an air interface 427 present at first major surface 422. In other embodiments, a low-index layer separates switchable diffuser 420 and light guide 460.

Figure 5:
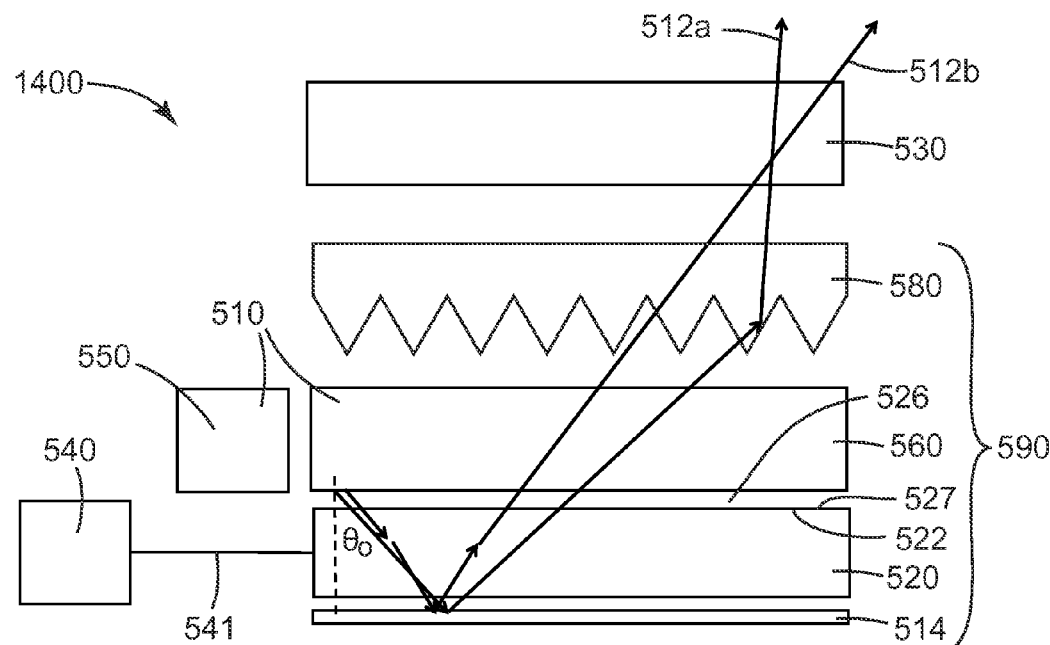
FIG. 5 is a side view of an optical system.

An embodiment of a system having the general structure of optical system 200 of FIG. 2 where first optional optical component 270 and second optional optical component 275 are not included and third optional optical component 280 is a turning film is illustrated in FIG. 5.

FIG. 5 is a schematic side view of optical system 500 including lighting component 510, reflector 514, switchable diffuser 520, display panel 530, and diffuser controller 540 which provides diffuser state data to switchable diffuser 520 on diffuser data channel 541. Lighting component 510 includes light source 550 and light guide 560. Optical system 500 is capable of producing light having optical path 512a and light having optical path 512b. Optical system 500 also includes turning film 580 which is disposed with prisms facing toward lighting component 510. Optical system 500 includes a region 590 extending from the reflector 514 through the turning film 580, which may be a low-absorbing optical component, and extending across first major surface 522 of the switchable diffuser 520. In some embodiments, region 590 is a low-absorbing region.

Light guide 560 provides a light output that has an angular distribution with a peak intensity at an angle $\theta_O$ relative to a downward normal to the light guide. As discussed elsewhere, this can be achieved by using various extraction features in the light guide as is known in the art. $\theta_O$ may be, for example, in the range of about 30 degrees to about 75 degrees. The output of the light guide may be partially collimated along the direction defined by the angle $\theta_O$.

Light from the light guide 560 passes through the switchable diffuser 520 to reflector 514, where it reflects, and it is then transmitted through light guide 560 towards turning film 580. Reflector 514 may be a substantially specular reflector such as an Enhanced Specular Reflector (ESR) available from 3M Company (St. Paul, Minn.). Turning film 580 is configured to turn light having a propagation direction specified by the angle $\theta_O$ toward the normal of the display panel. Light incident on turning film 580 at input angles substantially different from $\theta_O$ will not necessarily be turned toward the normal of the display panel. In other words, turning film 580 has a preferred input angle and will provide a preferred output when light having the preferred input angled is provided but will generally not provide the preferred output when other input distributions are provided.

When the switchable diffuser 520 is in a substantially clear state, light passes through switchable diffuser 520 without any substantial scattering so that it is provided to turning film 580 at the turning film's preferred input angle. The light is then turned by turning film 580 so that it has an output direction closer to the normal of the display panel than it would have had without turning film 580 present. For example, a light ray may follow optical path 512a when the diffuser is in a substantially clear state. When switchable diffuser 520 is in a hazy state, light from light guide 560 can be deflected as it passes through switchable diffuser 520 to reflector 514 and/or as it passes from reflector 514 to turning film 580 so that it is not provided to turning film 580 at the turning film's preferred input angle. This allows the light to exit the display panel at a large angle relative to the normal to the display panel. For example, a light ray can follow optical path 512b when the diffuser is in a hazy state.

In the embodiment illustrated in FIG. 5, only an air gap 526 separates switchable diffuser 520 and light guide 560 so that there is an air interface 527 present at first major surface 522. In other embodiments, a low-index layer separates switchable diffuser 520 and light guide 560.

In any of the optical systems of the present description, the low-absorbing optical component may be a lens which provides a collimating and/or a turning effect. In some embodiments the lens is a total internal reflection lens (TIR lens) where light from a lighting component that enters the lens through a switchable diffuser is reflected from an outer surface of the lens via TIR.

In some embodiments, the switchable diffuser has one or more regions that are independently addressable. Each region is capable of being in a first state and a second state different from the first state. For example, the first state may be a hazy state and the second state may be a substantially clear state. In some embodiments, each region is capable of being in a first state, a second state different from the first state and a third state different from the first and the second state. For example, the first state may be a first hazy state having a first haze, the second state may be a second hazy state having a second haze different from the first haze, and the third state may be a substantially clear state. In some embodiments, each region is capable of being in a substantially clear state and a first hazy state. In some embodiments, each region is capable of being in a substantially clear state, a first hazy state and a second hazy state different from the first hazy state. In some embodiments, each region can be in a maximum haze state having the maximum haze that can be achieved by the switchable diffuser. In some embodiments, each region can be in any of a substantially clear state and a plurality of hazy states that can be varied substantially continuously from the substantially clear state to the maximum haze state.

Figure 6:
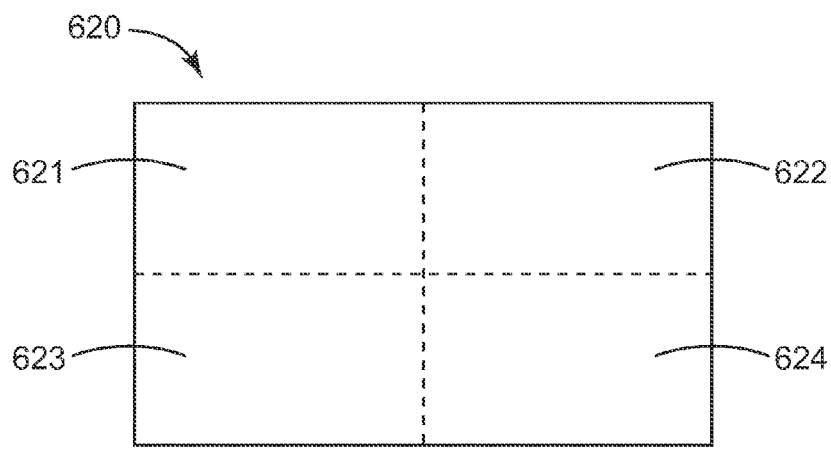
FIG. 6 is a front view of a switchable diffuser.

In some embodiments, the one or more regions of the switchable diffuser include at least four regions that are passive matrix addressable. An electrically switchable diffuser having a plurality of addressable regions as illustrated in FIG. 6 which shows switchable diffuser 620 having independently addressable regions 621, 622, 623 and 624. In the embodiment illustrated in FIG. 6, the four regions 621-624 are arranged in a rectangular array of regions. In other embodiments, the regions are arranged as adjacent stripes, each of which may extend along a length or a width of a display.

A voltage waveform may be applied to a switchable diffuser in order to change the state of the diffuser. In some embodiments, the waveform is applied using a switching device. In some embodiments, a switching device is provided as a component of the switchable diffuser. In some embodiments, a switching device may be disposed in a display housing containing the switchable diffuser. In some embodiments, a switching device may be provided as a physically separate component located exterior to a display housing that contains the switchable diffuser. In some embodiments, the switchable diffuser includes a layer of smectic A material. In some embodiments, the thickness of the smectic A material is in a range of 5 microns to 20 microns.

Voltage waveforms needed to cause smectic A material, or other switchable diffuser material, to change states are known in the art. Suitable waveforms are described, for example, in U.S. Pat. No. 4,893,117 (Blomley et al.). In some embodiments, a low-frequency waveform is applied to switch regions from a clear state to a haze state and a high-frequency waveform is used to switch regions from a hazy state to a clear state. In some embodiments, the low-frequency waveform has a frequency in the range of about 10 Hz to about 100 Hz (for example, about 50 Hz). In some embodiments, the high-frequency waveform has a frequency in the range of about 0.5 kHz to about 4 kHz (for example, about 1 kHz).

The hazy state can be adjusted by the time that the voltage waveform is applied to the switchable diffuser in the clear state. For example, a low-frequency waveform applied to a switchable diffuser in the substantially clear state for a first time period can result in a first hazy state having a first haze and a low-frequency waveform applied to a switchable diffuser in the substantially clear state for a second time period can result in a second hazy state having a second haze that is different from the first haze. For example, the first time period can be 800 ms and the second time period can be 400 ms resulting in a first haze that is higher than the second haze.

In some embodiments, when the switchable diffuser is in a state where some regions are in a clear state and some regions are in a hazy state and both clear to hazy and hazy to clear state changes are needed, the diffuser controller is configured to first apply a low-frequency waveform to those regions that are to be changed from a clear state to a hazy state followed by applying a high-frequency waveform to those regions that are to be changed from a hazy state to a clear state. In some embodiments, when the switchable diffuser is in a state where some regions are in a clear state and some regions are in a hazy state and both clear to hazy and hazy to clear state changes are needed, the diffuser controller is configured to first apply a high-frequency waveform to those regions that are to be changed from a hazy state to a clear state followed by applying a low-frequency waveform to those regions that are to be changed from a clear state to a hazy state. In some embodiments, when the switchable diffuser is in a state where some regions are in a clear state and some regions are in a hazy state and both clear to hazy and hazy to clear state changes are needed, the diffuser controller is configured to apply a low-frequency waveform to those regions that are to be changed from a clear state to a hazy state in a first time period and apply a high-frequency waveform to those regions that are to be changed from hazy state to a clear state in a second time period where the first time period and the second time period overlap.

The following is a list of exemplary embodiments of the present description.

Item 1 is an optical system comprising:
a switchable diffuser having a first major surface, the switchable diffuser capable of being in a substantially clear state or in a first hazy state;
a low-absorbing optical component disposed adjacent the switchable diffuser opposite the first major surface; and
a lighting component disposed to illuminate the switchable diffuser from the first major surface,
wherein the optical system is configured such that either an air interface is present at the first major surface of the switchable diffuser or a low-index layer is disposed between the lighting component and the switchable diffuser, and wherein the low-absorbing optical component provides a collimating effect or a turning effect when the lighting component illuminates the switchable diffuser from the first major surface and the switchable diffuser is in the substantially clear state.

Item 2 is the optical system of item 1, wherein the lighting component includes a light source and a light guide.

Item 3 is the optical system of item 2, wherein the switchable diffuser is disposed adjacent the light guide with the first major surface facing the light guide.

Item 4 is the optical system of item 3, wherein only an air gap separates the switchable diffuser and the light guide.

Item 5 is the optical system of item 3, wherein the low-index layer separates the switchable diffuser and the light guide.

Item 6 is the optical system of item 5, wherein the low-index layer is an optically clear adhesive having a refractive index less than or equal to about 1.42.

Item 7 is the optical system of item 1, wherein a region extending from the lighting component through the low-absorbing optical component and extending across the first major surface of the switchable diffuser is a low-absorbing region.

Item 8 is an optical system comprising:
a light guide;
a switchable diffuser adjacent the light guide, the switchable diffuser capable of being in either a substantially clear state or in a first hazy state;
a low-absorbing optical component disposed adjacent the switchable diffuser opposite the light guide or disposed adjacent the light guide opposite the switchable diffuser or disposed adjacent the light guide opposite an output surface of the optical system,
wherein an air gap or a low-index layer separates the switchable diffuser and the light guide, and wherein the low-absorbing optical component provides a collimating effect or a turning effect when a light is input into the light guide and the switchable diffuser is in the substantially clear state.

Item 9 is the optical system of item 8, wherein the low-absorbing optical component is disposed adjacent the switchable diffuser opposite the light guide.

Item 10 is the optical system of item 9, wherein a region extending from the light guide through the low-absorbing optical component and extending across a first major surface of the switchable diffuser is a low-absorbing region.

Item 11 is the optical system of item 8, wherein the low-absorbing optical component is disposed adjacent the light guide opposite the switchable diffuser and the optical system further comprises a reflector disposed adjacent the switchable diffuser opposite the light guide.

Item 12 is the optical system of item 11, wherein a region extending from the reflector through the low-absorbing optical component and extending across a first major surface of the switchable diffuser is a low-absorbing region.

Item 13 is the optical system of item 8, wherein only the air gap separates the switchable diffuser and the light guide.

Item 14 is the optical system of item 8, wherein the low-index layer separates the switchable diffuser and the light guide.

Item 15 is an optical system comprising:
a light guide including light extraction features;
a switchable diffuser adjacent the light guide, the switchable diffuser capable of being in a substantially clear state or in a first hazy state;
a low-absorbing optical component disposed adjacent the switchable diffuser opposite the light guide or disposed adjacent the light guide opposite the switchable diffuser or disposed adjacent the light guide opposite an output surface of the optical system,
wherein the low-absorbing optical component provides a collimating effect or a turning effect when a light is input into the light guide and the switchable diffuser is in the substantially clear state.

Item 16 is the optical system of item 15, wherein the low-absorbing optical component is disposed adjacent the switchable diffuser opposite the light guide.

Item 17 is the optical system of item 16, wherein a region extending from the light guide to the low-absorbing optical component and extending across a first major surface of the switchable diffuser is a low-absorbing region.

Item 18 is the optical system of item 15, wherein the low-absorbing optical component is disposed adjacent the light guide opposite the switchable diffuser and the optical system further comprises a reflector disposed adjacent the switchable diffuser opposite the light guide.

Item 19 is the optical system of item 18, wherein a region extending from the reflector to the low-absorbing optical component and extending across a first major surface of the switchable diffuser is a low-absorbing region.

Item 20 is the optical system of item 15, wherein an air gap separates the switchable diffuser and the light guide.

Item 21 is the optical system of any of items 1-20, wherein the low-absorbing optical component includes a prism film disposed to increase the collimation of a light output of the optical system.

Item 22 is the optical system of any of items 1-20, wherein the low-absorbing optical component includes a prism film disposed to turn a light output of the optical system from a first direction to a second direction different from the first direction.

Item 23 is the optical system of any of items 1-20, wherein the low-absorbing optical component is configured to provide a light output having a first angular distribution when a light input having a second angular distribution is provided to the low-absorbing optical component, wherein the first angular distribution is either has a mean output direction substantially closer to a normal of an output surface of the optical system or is substantially more collimated compared to the second angular distribution.

Item 24 is the optical system of any of items 1-20, wherein the optical system is configured to produce a first light output in a narrow viewing angle mode when the switchable diffuser is in the substantially clear state and to produce a second light output in a wide viewing angle mode when the switchable diffuser is in the first hazy state.

Item 25 is the optical system of any of items 1-20, wherein the switchable diffuser is capable of being in a second hazy state different from the first hazy state.

Item 26 is the optical system of any of items 1-20, wherein the switchable diffuser is bistable.

Item 27 is the optical system of any of items 1-20, wherein the switchable diffuser includes smectic A liquid crystal.

Item 28 is the optical system of any of items 1-20, wherein the switchable diffuser includes a plurality of addressable regions.

Item 29 is a display comprising the optical system of any of items 1-20.

Item 30 is a luminaire comprising the optical system of any of items 1-20.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system comprising:
a switchable diffuser having a first major surface, the switchable diffuser capable of being in a substantially clear state or in a first hazy state;
a low-absorbing optical component disposed adjacent the switchable diffuser opposite the first major surface; and
a lighting component disposed to illuminate the switchable diffuser from the first major surface,
wherein the optical system is configured such that either an air interface is present at the first major surface of the switchable diffuser or a low-index layer is disposed between the lighting component and the switchable diffuser, wherein the low-absorbing optical component provides a collimating effect or a turning effect when the lighting component illuminates the switchable diffuser from the first major surface and the switchable diffuser is in the substantially clear state, and wherein the lighting component includes a light source and a light guide.

2. The optical system of claim 1, wherein the switchable diffuser is disposed adjacent the light guide with the first major surface facing the light guide.

3. The optical system of claim 2, wherein only an air gap separates the switchable diffuser and the light guide.

4. The optical system of claim 2, wherein the low-index layer separates the switchable diffuser and the light guide.

5. The optical system of claim 1, wherein a region extending from the lighting component through the low-absorbing optical component and extending across the first major surface of the switchable diffuser is a low-absorbing region.

6. The optical system of claim 1, wherein the low-absorbing optical component is configured to provide a light output having a first angular distribution when a light input having a second angular distribution is provided to the low-absorbing optical component, wherein the first angular distribution is either has a mean output direction substantially closer to a normal of an output surface of the optical system or is substantially more collimated compared to the second angular distribution.

7. The optical system of claim 1, wherein the switchable diffuser includes smectic A liquid crystal.

8. The optical system of claim 1, wherein the switchable diffuser includes a plurality of addressable regions.

9. An optical system comprising:
a light guide;
a switchable diffuser adjacent the light guide, the switchable diffuser capable of being in either a substantially clear state or in a first hazy state;
a low-absorbing optical component disposed adjacent the switchable diffuser opposite the light guide or disposed adjacent the light guide opposite the switchable diffuser or disposed adjacent the light guide opposite an output surface of the optical system,
wherein an air gap or a low-index layer separates the switchable diffuser and the light guide, and wherein the low-absorbing optical component provides a collimating effect or a turning effect when a light is input into the light guide and the switchable diffuser is in the substantially clear state.

10. The optical system of claim 9, wherein the low-absorbing optical component is disposed adjacent the switchable diffuser opposite the light guide.

11. The optical system of claim 10, wherein a region extending from the light guide through the low-absorbing optical component and extending across a first major surface of the switchable diffuser is a low-absorbing region.

12. The optical system of claim 9, wherein the low-absorbing optical component is disposed adjacent the light guide opposite the switchable diffuser and the optical system further comprises a reflector disposed adjacent the switchable diffuser opposite the light guide.

13. The optical system of claim 9 wherein the low-absorbing optical component is configured to provide a light output having a first angular distribution when a light input having a second angular distribution is provided to the low-absorbing optical component, wherein the first angular distribution is either has a mean output direction substantially closer to a normal of an output surface of the optical system or is substantially more collimated compared to the second angular distribution.

14. The optical system of claim 9, wherein the switchable diffuser includes smectic A liquid crystal.

15. The optical system of claim 9, wherein the switchable diffuser includes a plurality of addressable regions.

16. An optical system comprising:
a light guide including light extraction features;
a switchable diffuser adjacent the light guide, the switchable diffuser capable of being in a substantially clear state or in a first hazy state;
a low-absorbing optical component disposed adjacent the switchable diffuser opposite the light guide or disposed adjacent the light guide opposite the switchable diffuser or disposed adjacent the light guide opposite an output surface of the optical system,
wherein the low-absorbing optical component provides a collimating effect or a turning effect when a light is input into the light guide and the switchable diffuser is in the substantially clear state.

17. The optical system of claim 16, wherein the low-absorbing optical component is disposed adjacent the switchable diffuser opposite the light guide.

18. The optical system of claim 17, wherein a region extending from the light guide to the low-absorbing optical component and extending across a first major surface of the switchable diffuser is a low-absorbing region.

19. The optical system of claim 16, wherein the low-absorbing optical component is disposed adjacent the light guide opposite the switchable diffuser and the optical system further comprises a reflector disposed adjacent the switchable diffuser opposite the light guide.

20. The optical system of claim 16, wherein the low-absorbing optical component is configured to provide a light output having a first angular distribution when a light input having a second angular distribution is provided to the low-absorbing optical component, wherein the first angular distribution is either has a mean output direction substantially closer to a normal of an output surface of the optical system or is substantially more collimated compared to the second angular distribution.

21. The optical system of claim 16, wherein the switchable diffuser includes smectic A liquid crystal.

22. The optical system of claim 16, wherein the switchable diffuser includes a plurality of addressable regions.

* * * * *

UNITED STATES PATENT AND TRADEMARK OFFICE
CERTIFICATE OF CORRECTION

Page 1 of 1

PATENT NO. : 9,921,345 B2
APPLICATION NO. : 15/301780
DATED : March 20, 2018
INVENTOR(S) : Wheatley et al.

It is certified that error appears in the above-identified patent and that said Letters Patent is hereby corrected as shown below:

In the Specification

Column 7
Line 39, delete "$0_W$" and insert -- $\theta_W$ --, therefor.

Signed and Sealed this
Twentieth Day of November, 2018

Andrei Iancu
*Director of the United States Patent and Trademark Office*